United States Patent [19]

Nguyen

[11] Patent Number: 4,576,043
[45] Date of Patent: Mar. 18, 1986

[54] METHODS FOR METERING TWO-PHASE FLOW

[75] Inventor: Tanh V. Nguyen, Fullerton, Calif.

[73] Assignee: Chevron Research Company, San Francisco, Calif.

[21] Appl. No.: 611,455

[22] Filed: May 17, 1984

[51] Int. Cl.$^4$ .............................. G01F 1/76; G01F 1/36
[52] U.S. Cl. .................................. 73/195; 73/861.04; 73/861.52; 364/510
[58] Field of Search ............. 73/29, 195, 196, 861.04, 73/861.52, 861.61, 861.63; 364/510

[56] References Cited

U.S. PATENT DOCUMENTS

| 2,439,723 | 4/1948 | Engdahl | 73/861.04 X |
| 4,149,403 | 4/1979 | Muldary et al. | 73/29 |
| 4,312,234 | 1/1982 | Rhodes et al. | 73/861.04 |
| 4,405,559 | 9/1983 | Tokarz | 376/247 |

OTHER PUBLICATIONS

Collins et al., "Measurement of Steam Quality in Two-Phase Upflow with Venturimeters and Orifice Plates", Journal of Basic Eng'g, Mar. 1971, pp. 11–21.
Sekoguchi et al., "Two-Phase Flow Measurements with Orifice-Couple in Horizontal Pipe Line", Bulletin of JSME, vol. 21, No. 162, Dec. 1978, pp. 1757–1761.

*Primary Examiner*—Charles A. Ruehl
*Attorney, Agent, or Firm*—S. R. LaPaglia; E. J. Keeling; P. L. McGarrigle

[57] ABSTRACT

A method for metering two-phase flow wherein the successive accelerational pressure drops across an orifice plate and across a venturi coupled in series with the orifice plate are correlated to obtain one or more flowrate parameter.

2 Claims, 2 Drawing Figures

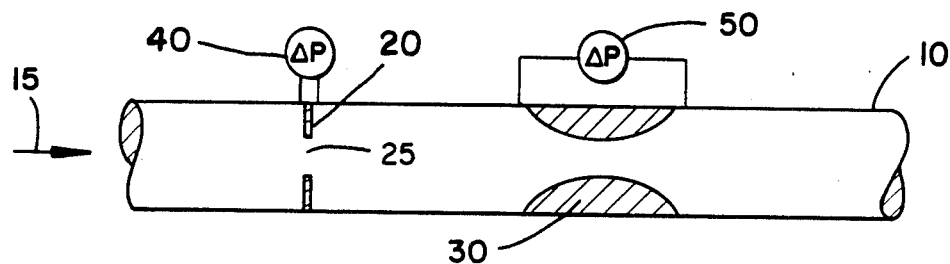
FIG _ 1
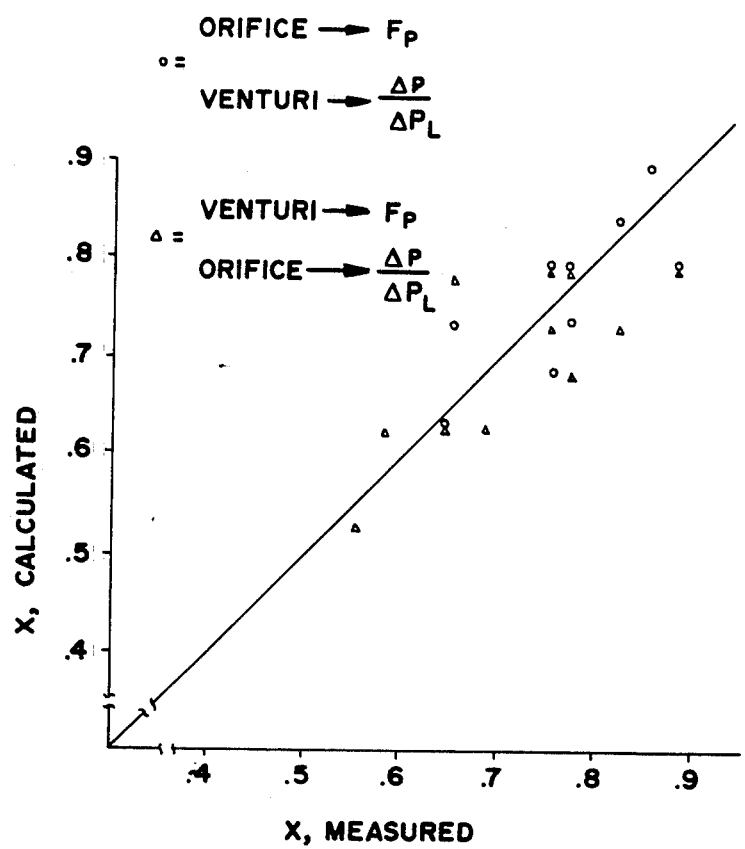
FIG _ 2

METHODS FOR METERING TWO-PHASE FLOW

BACKGROUND OF THE INVENTION

The present invention pertains in general to methods for metering two-phase flow and in particular to methods for metering two-phase flow using an orifice plate and a venturi in series.

In an oil field in which steam injection is employed to enhance oil recovery, each of a number of steam injectors may be fed by a branch of a trunk line from a common steam generator. Due to flow-splitting phenomena at the branches, a different ratio of steam to total flow (steam plus water), also called steam quality, is likely to be present in each branch.

A knowledge of the ratio of steam to total flow being injected in a two-phase flow is critical to any understanding of the effects of steam injection. Because it is impractical to predict this ratio from analysis of the injection apparatus, it is important to be able to determine flowrate parameters for calculating steam quality from measurements made at each branch.

Many methods for metering single-phase flow, such as those dependent upon critical choke flow or those employing single orifice meters, lose their accuracy when applied to a two-phase flow system. Other methods, such as steam calorimetry, have inherent sampling problems.

Two-phase flow may be metered by employing two or more measurements which are mathematically correlated.

One such approach involves the use of a gamma ray densitometer to make void fraction measurements and a turbine meter or drag disc to obtain a second measurement. This approach is limited to a small quality range and requires the use of an expensive and delicate gamma ray densitometer instrument.

In another such approach, exemplified by K. Sekoguchi et al, "Two-Phase Flow Measurements with Orifice Couple in Horizontal Pipe Line", *Bulletin of the ISME*, Vol. 21, No. 162, December, 1978, pp. 1757-64, two segmental orifices or baffles are coupled in series. The pressure drop across each orifice or baffle is measured and correlated with the pressure drop across the other orifice or baffle. The orifices must differ in configuration in order to provide independent measurements for the purpose of correlation. One drawback of this approach is that data is not presented in dimensionless form suitable for predicting performances for different systems.

Yet another such approach involves measurement of a frictional pressure drop across a twisted tape, measurement of an accelerational pressure drop across a venturi and correlation of the results. A disadvantage of this approach is that a very sensitive device is required to measure the pressure drop across the twisted tape.

Measurement of the pressure drops across a venturi and an orifice in series may be done simply and at reasonable cost, as shown in D. Collins et al, "Measurement of Steam Quality in Two-phase Upflow with Venturi Meters and Orifice Plates", *Journal of Basic Engineering, Transactions of the ISME*, March 1971. Although concurrent pressure drops were measured for calibration purposes in Collins et al, pp. 11-21, the pressure drops across an orifice plate and across a venturi coupled in series have not previously been correlated for the purpose of metering two-phase flow prior to the present invention.

SUMMARY OF THE INVENTION

Accordingly, the method of the present invention involves metering two-phase flow in a pipeline including the following steps. A venturi is installed in the pipeline. An orifice plate is coupled in series with the venturi in the pipeline and two-phase flow is introduced. The respective accelerational pressure drops across the venturi and across the orifice plate are measured and then correlated to obtain one or more two-phase flow flowrate parameters.

BRIEF DESCRIPTION OF THE DRAWINGS

FIG. 1 is a view in diagrammatic partial cross-section of an apparatus for practicing the method according to the present invention; and FIG. 2 is a plot of the steam quality as calculated according to the method of the present invention versus measured steam quality.

DESCRIPTION OF THE PREFERRED EMBODIMENT

As illustrated in FIG. 1, apparatus for practicing the method according to the present invention includes an orifice plate 20 having a concentric orifice 25 within a portion of a steam pipeline 10. A venturi 30 is coupled in series with orifice plate 20 so that the same two-phase flow of steam and water passes through both in direction 15.

The accelerational pressure drop across orifice plate 20 is measured by means of pressure gauge 40 while the accelerational pressure drop across venturi 30 is measured by pressure gauge 50.

Steam pipelines and generators for two-phase steam flow are well understood by those skilled in the art and will not be discussed further. Venturi 30 may be a standard Herschel venturimeter. Orifice plate 20 may be a sharp-edged orifice plate having a concentric orifice. Gauges 40 and 50 may be piezoelectric strain-gauges or mercury manometers, for example.

According to a preferred embodiment of the present invention, two sets of calculations are correlated in order to obtain steam quality or flow rate. A first set of three equations is applied to the pressure drop across venturi 30 while a second set of three equations is applied to the pressure drop across orifice plate 20.

The first set of equations makes use of Martinelli's parameter $1/X$ as defined by $$\frac{1}{X} = \left(\sqrt{\frac{\rho_l}{\rho_g}}\right)\left(\frac{x}{1-x}\right) \tag{1}$$

where:

$X$ = the steam quality;

$\rho_l$ = the density of the liquid phase (water); and $\rho_g$ = the density of the gas phase (steam).

Martinelli's parameter is used to calculate the liquid pseudo-pressure drop, $\Delta p_l$, which is the pressure drop which would be recorded if the liquid phase were flowing as a single-phase fluid, so that $$\Delta p_l = \frac{\Delta p}{1 + C\left(\frac{1}{X}\right) + \left(\frac{1}{X}\right)^2} \quad (2)$$

where:
Δp = the measured two-phase pressure drop;
C = a correlation coefficient based upon calibration data; and all other variables are as defined above.

The liquid pseudo-pressure drop is used to calculate the two-phase mass flow rate, W, using the equation:

$$W = \frac{K\sqrt{\rho_l \Delta p_l}}{1 - x} \quad (3)$$

where: K = the appropriate orifice or venturi coefficient; and all other variables are as defined above.

In the above set of equations, steam and water densities at given temperature and pressures are readily available to those skilled in the art in tabular form. The correlation coefficient, C, is readily obtainable for a given venturi or orifice by running calibration tests on the orifice or venturi. The constant, K, may be calculated according to the American Gas Association Method as described in "Orifice Metering of Natural Gas", *American Gas Association Report* No. 3, June, 1979.

The second set of calculations employs the parameter $F_p$ modified from Rhodes et al, U.S. Pat. No. 4,312,234, at column 4, as:

$$F_p = D^2 \left(\frac{\sqrt{\rho_g \Delta p}}{W}\right) \quad (4)$$

where: D = the diameter of the orifice or venturi, and all other variables are as defined above.

$F_p$ is correlated as a function of steam quality, x, in the form:

$$F_p = ax^b \quad (5)$$

where a and b are constants obtained by running calibration tests on a particular orifice or venturi.

The total mass flow rate is then given by:

$$W = \frac{D^2}{a}(\sqrt{\rho_g \Delta p})x^{-b} \quad (6)$$

where all variables are as defined above.

Accordingly, in order to predict quality and flow rate, equations (1)-(3) may be applied to orifice plate 20, for example, and equations (4)-(6) may be applied to venturi 30, for example. These two sets of equations are solved for the two-phase flow rate, W. At the correct value for steam quality, x, the two-phase flow rates given by equations (3) and (6) should be equal.

EXAMPLE

Data was collected using an orifice plate having a 2-inch diameter orifice and a 2-inch internal diameter venturi tube in a 3-inch schedule 80-pipe. Two-phase steam was introduced into the pipe.

Equations (1)-(3) were applied to venturi tube 30 and equations (4)-(6) were applied to orifice plate 20.

For venturi 30, $$\Delta p_l = \frac{\Delta p}{1 + 11.5\left(\frac{1}{X}\right) + \left(\frac{1}{X}\right)^2} \quad (7)$$

and $$W = \frac{11.7\sqrt{\rho_l \Delta p_l}}{1 - x} \quad (8)$$

For orifice plate 20, $$F_p = 1.396x^{0.871}, \quad (9)$$

and $$W = 2.87\sqrt{\rho_g \Delta p}\, x^{-0.871} \quad (10)$$

As illustrated by the open circles plotted in FIG. 3, the following results were obtained for steam quality:

| Measured Quality | Predicted Quality |
|---|---|
| 0.75 | 0.78 |
| 0.85 | 0.88 |
| 0.75 | 0.68 |
| 0.65 | 0.73 |
| 0.82 | 0.78 |
| 0.88 | 0.73 |
| 0.77 | 0.73 |
| 0.64 | 0.63 |
| 0.77 | 0.68 |

For comparison, equations (1)-(3) were applied to orifice plate 20 and equation (4)-(6) were applied to venturi 30 as follows:

For venturi 30, $$F_p = 1.058x^{1.128}, \quad (11)$$

and $$W = 3.78(\sqrt{\rho_g \Delta p})x^{-1.128} \quad (12)$$

For orifice plate 20, $$\frac{\Delta p}{\Delta p_l} = 1 + 4.5\left(\frac{1}{X}\right) + \left(\frac{1}{X}\right)^2 \quad (13)$$

and $$W = \frac{7.44\sqrt{\rho_l \Delta p_l}}{1 - x} \quad (14)$$

As illustrated by the triangles plotted in FIG. 3, by applying equations (1)-(3) to orifice plate 20 and equations (4)-(6) to venturi 30, the following results were obtained:

| Measured Quality | Predicted Quality |
|---|---|
| 0.75 | 0.725 |
| 0.85 | 0.675 |
| 0.75 | 0.775 |
| 0.65 | 0.775 |
| 0.82 | 0.725 |
| 0.88 | 0.775 |
| 0.77 | 0.775 |

| Measured Quality | Predicted Quality |
|---|---|
| 0.64 | 0.623 |
| 0.77 | 0.675 |

One of the advantages of the method according to the present invention is that venturi and orifice plates are very popular in flow metering and thus are easily obtainable and well understood. Also, only two parameters are measured to predict flow rates as opposed to most techniques which require three parameters to be measured.

While the present invention has been described in terms of a preferred embodiment, further modifications and improvements will occur to those skilled in the art. For example, although metering of two-phase steam has been described above, metering of any two-phase flow may be obtained by employing the method according to the present invention.

I desire it to be understood, therefore, that this invention is not limited to the particular form shown and that I intend in the appealed claims to cover all such equivalent variations which come within the scope of the invention as claimed.

What is claimed is:

1. A method for metering two-phase flow in a pipeline comprising the steps of:
    installing a venturi in the pipeline;
    coupling an orifice plate in series with the venturi in the pipeline;
    introducing two-phase flow into the pipeline;
    measuring the two-phase pressure drop across the venturi;
    measuring the two-phase pressure drop across the orifice plate; and
    correlating the two-phase pressure drop across the venturi as determined by a first set of equations with the two-phase pressure drop across the orifice plate as determined by a second set of equations to obtain one or more two-phase flow rate parameters, wherein said first set of equations comprises:

$$\frac{1}{X} = \left(\sqrt{\frac{\rho_l}{\rho_g}}\right)\left(\frac{x}{1-x}\right),$$

$$\Delta p_l = \frac{\Delta p}{1 + C\left(\frac{1}{X}\right) + \left(\frac{1}{X}\right)^2}, \text{ and}$$

$$W = \frac{K\sqrt{\rho_l \Delta p_l}}{1-x},$$

and wherein said second set of equations comprises:

$$F_p = D^2 \frac{(\sqrt{\rho_g \Delta p})}{W},$$

$$F_p = ax^b, \text{ and}$$

$$W = \frac{D^2}{a}(\sqrt{\rho_g \Delta p})x^{-b}$$

where:
 $1/X$ = Martinelli's parameter,
 $x$ = quality,
 $\rho_l$ = the density of a liquid phase,
 $\rho_g$ = the density of a gaseous phase,
 $\Delta p$ = the measured two-phase pressure drop across the device to which the equation is applied,
 $C$ = a correlation coefficient based upon calibration data,
 $W$ = the two-phase mass-flow rate,
 $K$ = an orifice coefficient for the venturi,
 $F_p$ = a flow parameter,
 $D$ = the diameter of the orifice,
 $a$ = a first constant determined from calibration data, and
 $b$ = a second constant based on calibration data.

2. A method for metering two-phase flow in a pipeline comprising the steps of:
    installing a venturi in the pipeline;
    coupling an orifice plate in series with the venturi in the pipeline;
    introducing two-phase flow into the pipeline;
    measuring the two-phase pressure drop across the venturi;
    measuring the two-phase pressure drop across the orifice plate; and
    correlating the two-phase pressure drop across the venturi as determined by a first set of equations with the two-phase pressure drop across the orifice plate as determined by a second set of equations to obtain one or more two-phase flow rate parameters, wherein said first set of equations comprises:

$$F_p = D^2 \frac{(\sqrt{\rho_g \Delta p})}{W},$$

$$F_p = ax^b, \text{ and}$$

$$W = \frac{D^2}{a}(\sqrt{\rho_g \Delta p})x^{-b}$$

and wherein said second set of equations comprises:

$$\frac{1}{X} = \left(\sqrt{\frac{\rho_l}{\rho_g}}\right)\left(\frac{x}{1-x}\right),$$

$$\Delta p_l = \frac{\Delta p}{1 + C\left(\frac{1}{X}\right) + \left(\frac{1}{X}\right)^2}, \text{ and}$$

$$W = \frac{K\sqrt{\rho_l \Delta p_l}}{1-x},$$

where:
 $1/X$ = Martinelli's parameter,
 $x$ = quality,
 $\rho_l$ = the density of a liquid phase,
 $\rho_g$ = the density of a gaseous phase,
 $\Delta p$ = the measured two-phase pressure drop across the device to which the equation is applied,
 $C$ = a correlation coefficient based upon calibration data,
 $W$ = the two-phase mass-flow rate,
 $K$ = an orifice coefficient for the orifice plate,
 $F_p$ = a flow parameter,
 $D$ = the diameter of the venturi,
 $a$ = a first constant determined from calibration data, and
 $b$ = a second constant based on calibration data.

* * * * *